June 13, 1939.                W. H. CAMPBELL                2,162,548
                           METER SEALING DEVICE
                          Filed April 15, 1938
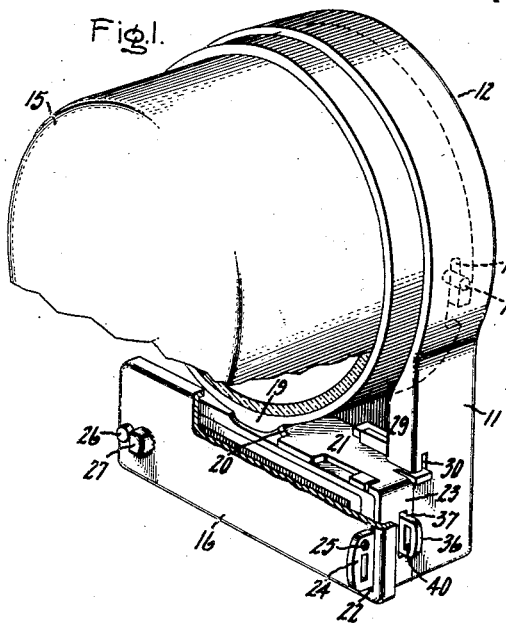
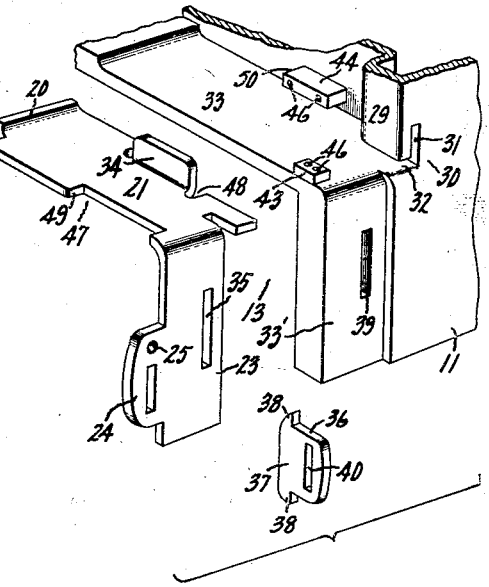
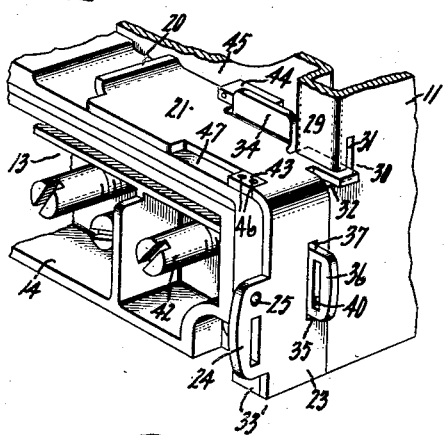
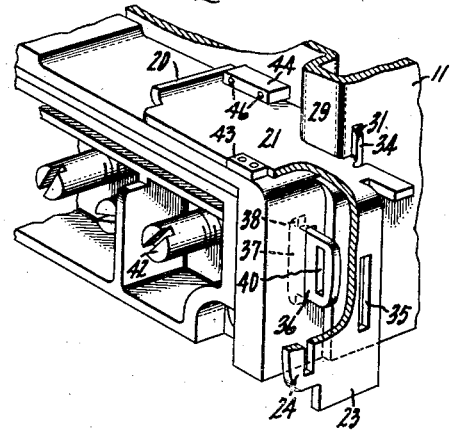
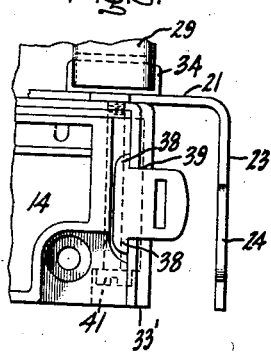
Inventor:
Wendell H. Campbell,
by Harry E. Dunham
His Attorney.

Patented June 13, 1939

2,162,548

UNITED STATES PATENT OFFICE 2,162,548

METER SEALING DEVICE

Wendell H. Campbell, Lynn, Mass., assignor to General Electric Company, a corporation of New York Application April 15, 1938, Serial No. 202,278

4 Claims. (Cl. 171—34)

My invention relates to casings, and locking and sealing arrangements therefor, and concerns particularly casings for electrical apparatus having a pair of chambers with different covers therefor, so arranged that a single sealing device may be used for sealing both covers or only one cover as desired.

It is an object of my invention to produce casings for electrical devices such as watt-hour meters in which the manufacturing cost is relatively low by reason of relatively low cost of manufacturing operations and relatively low cost of materials.

It is a further object of my invention to simplify the process of manufacturing meter casings.

It is an object of my invention to eliminate substantially the possibility of any tampering with the watt-hour meter or the breakage of the parts of the sealing mechanism.

It is also an object of my invention to minimize the possibility of parts becoming lost or of openings being formed through which water may leak into any chamber of the meter casing from the top.

Other and further objects and advantages will become apparent as the description proceeds.

In carrying out my invention in its preferred form I utilize a locking and sealing bar of a type similar to that shown in Patent No. 1,979,928 to Hans Bakke, in which a single sealing mechanism may be employed for locking both the meter chamber cover and the terminal chamber cover, but I modify the construction of the casing in such a manner that the sealing bar is self-locking, although in my present construction no actual fastening means is required therefor. I provide this self-locking feature by forming a flange on the locking bar and an under-cut or L-shaped groove in the base of the casing such that the under-cut groove receives the flange and holds the sealing bar when the bar is in an unlocked position; and I provide a clip which is inserted in the end of the terminal chamber from inside the terminal chamber and which protrudes from the terminal chamber and through a slot in a lateral arm of the sealing bar so as to hold the sealing bar when the bar is in a locking position.

The invention will be understood more readily from the following detailed description when considered in connection with the accompanying drawing and those features of the invention which are believed to be novel and patentable will be pointed out in the claims appended hereto.

In the drawing Fig. 1 is a perspective view of an electric meter casing forming one embodiment of my invention, a portion of the apparatus being broken away to show the internal construction. Fig. 2 is an enlarged detailed view of one corner of the apparatus of Fig. 1 showing the locking and sealing arrangement with the terminal chamber cover removed. Fig. 3 is a perspective, exploded view of the parts shown in Fig. 2, and Fig. 4 is a perspective view corresponding to Fig. 2 in which the sealing bar is shown in an unlocked position instead of in a locking position as in Fig. 2. Fig. 5 is a detail view showing in front elevation a portion of the apparatus with the parts in the position represented in Fig. 4. Like reference characters are utilized throughout the drawing to designate like parts.

My invention is illustrated as used in a watt-hour meter casing having certain standard and well-known features of construction, such as a meter chamber cover with a bayonet lock and a terminal chamber cover with a slot at one end engaging a stud and having a slot at the other end adapted to receive a lug having an opening into which a sealing device may be inserted. The meter casing comprises a base portion 11 which may be die-cast. There is a circular chamber 12 for the meter mechanism, and below the meter chamber a rectangular chamber 13 for receiving a terminal block 14. There is a cover 15 which may be of glass or other suitable material rimmed with metal for closing the meter chamber 12, and there is a cover 16 composed of material such as sheet metal for closing the terminal chamber 13. At the rim of the meter chamber cover 15 are a plurality of over-hanging slots 17 cooperating with pins 18 projecting inwardly from the corresponding rim portion of the meter chamber 12 to form a bayonet lock of the well-known type in which the meter chamber cover 15 is removed by twisting it to the left and pulling it forward and is inserted by pushing it into the meter chamber 12 and twisting to the right. As in the construction described in the aforementioned Patent No. 1,979,928 to Hans Bakke, the rim of the meter chamber cover 15 has a projection 19 against which a nose 20 of a sealing bar 21 abuts when the sealing bar is in a locking position for the purpose of preventing untwisting of the meter chamber cover 15 and thus locking it in position. Likewise, as in the construction shown in the aforementioned patent the terminal chamber cover 16 has a slot 22 at the right-hand end thereof and the sealing bar 21 has a downwardly extending lateral arm 23 with a forwardly projecting lug 24 adapted to extend through the slot 22 in the meter terminal cover 16 when the cover 16 is in place so that a suitable sealing device such as a sealing wire may be inserted through the hole 25 formed in the lug 24, thus not only preventing the terminal chamber cover 16 from being removed, but also preventing the sealing bar 21 from being slid to the right to its unlocked position which would permit untwisting and removal of the meter chamber cover 15. It will be understood that the left-hand end of the terminal chamber cover 16 is secured by a stud 26 fastened into the base 11, and having a head cooperating with a slot in the cover 16. The slot is not visible owing to being covered by the head of the stud 26 and by the upset portion 27 of the cover 16.

In the apparatus shown in my present application, however, I have changed the construction of the base portion 11 by forming therein a projecting portion 29 in which there is an under-cut or L-shaped groove 30. For convenience I refer to the under-cut portion 31 of the groove 30 as the base of the L and the open portion 32 of the groove as the side of the L (Fig. 3). Inasmuch as the terminal chamber 13 is deeper than the portion of the meter chamber 12 formed in the base portion 11 of the casing, the terminal chamber 13 has a top wall 33 extending horizontally from the remainder of the base portion 11, as well as end walls 33'. The surface of the top wall 33 forms one boundary of the side 32 of the L representing the shape of the groove 30. The sealing bar 21 is arranged to slide along the top wall 33 of the terminal chamber 13 and has a flange 34 which is adapted to slide through the under-cut portion 31 or the base of the L-shaped groove 30. The length of the groove 30 and the spacing between the right-hand end of the flange 34 and the lateral arm 23 of the sealing bar 21, however, are such that when the sealing bar 21 is moved to the left to its locking position represented in Figs. 1 and 2, the flange 34 clears the under-cut groove 30, but when the sealing bar 21 is moved to the right to its unlocked position illustrated in Figs. 4 and 5, the flange 34 extends the length of the groove 30 and prevents the sealing bar 21 from being removed by either upward or forward motion. Furthermore, the flange 29 and the main portion of the sealing bar 21 are made to fit the groove 30 closely enough so that the sealing bar 21 can not be removed by a twisting motion when the bar is in the unlocked position shown in Figs. 4 and 5.

As in the arrangement described in the aforementioned Patent No. 1,979,928, the lateral arm 23 of the sealing bar 21 has a slot 35 adapted to slip over a lug 36 in the end of the terminal chamber 13. However, in the construction described in my present application, the lug 36 is formed in a removable clip 37 having wings 38, and a rectangular opening 39 is provided in the right-hand end wall 33' of the terminal chamber 13 to permit the clip 37 to be inserted in place from inside the terminal chamber 13. The terminal block 14 may be slotted to receive the wing portions 38 of the clip and the clearance is such that when the terminal block 14 is inserted in the terminal chamber 13, relatively little free play is given the clip 37 and it is held in position so that it can not drop out or become lost.

The clip 37 has an opening 40 in its lug 36 for receiving a sealing device when it is desired to seal the meter cover 15 without sealing the terminal chamber cover 16, but in my present construction the slot 35 in the sealing bar 21 and the lug 36 serve the additional function of preventing the sealing bar 21 from being removed when the sealing bar is in its locking position represented in Figs. 1 and 2. In this way, the possibility of the sealing bar 21 dropping out when an authorized servicer is adjusting the meter and either applying or removing the sealing wires is obviated.

When the apparatus is originally assembled, the terminal block 14 is not in place and the first operation consists of moving the sealing bar 21 toward the base portion 11 of the casing from the position shown in Fig. 3, so that the sealing bar slides into the groove 30 and the flange 34 clears the groove 30. The sealing bar 21 is then in the position shown in Figs. 1 and 2. Thereupon, the clip 37 is inserted from inside the terminal chamber 13 and the next operation consists of inserting the terminal block 14. The terminal block 14 is ordinarily held in place by suitable screws 41 (Fig. 5) but is also held in place by the fact that the leads from the meter mechanism, not shown, are fastened to the terminal block 14 when the apparatus is assembled. Therefore, the terminal block 14 ordinarily remains in position and the clip 37 is retained in its position.

The terminal block 14 may be of the type illustrated in Patent No. 2,092,631 to Hans Bakke in which the connections to the meter mechanism are explained more in detail.

The structural features thus far described serve to prevent removal of the sealing bar 21 regardless of its position. In order to facilitate guiding the flange 34 into the under-cut portion of the groove 30 and in order to limit conveniently the extent of travel of the sealing bar 21 when moving to the unlocked position, a pair of blocks 43 and 44 may be provided which are secured to, or formed in, the base portion 11 of the casing. The block 43 aids in holding the sealing bar 21 back against the vertical wall 45 of the base 11 and the block 44 aids in holding the sealing bar 21 down against the top wall 33 of the terminal chamber 13. In this way, the flange 34 is properly guided into the groove 30. The blocks 43 and 44 may be secured to the base 11 in any suitable manner or may take the form of lugs cast integrally with the base 11. They are preferably die cast integrally with the base in order to secure a low cost. In the arrangement shown they are staked to the base 11 by pins 46. It will be understood that if the illustrated arrangement is used, holes in the base 11 for receiving the pins 46 will not be permitted to pierce the material, in order to guard against any possibility of leakage apertures being formed.

If desired for the sake of compactness, a notch 47 may be provided in the front edge of the sealing bar 21 for cooperating with the block 43 and the flange 34 may be bent up from a cut-back edge of the sealing bar 21, so as to leave a notch 48. If the flange 34 is so formed, it will be understood that the bottom of the groove 30 and the under-cut portion 31 will come sufficiently forward of the vertical surface 45 of the base 11 to permit receiving the flange 34. The left-hand end or shoulder 49 of the notch 47 and the left-hand end 50 of the block 44 may be so positioned that the shoulder 49 abuts the block 43 and the nose or projection 20 of the sealing bar 21 abuts the left-hand end 50 of the block 44 when the sealing bar 21 has been slid sufficiently far to the right to disengage the projection 19 on the rim of the meter chamber cover 15 so that the sealing bar is in its unlocked position. In this manner, unnecessary range of movement of the sealing bar 21 is prevented and further security is provided against the possibility of the bar 21 dropping out or being pried out when the apparatus is unsealed by the person authorized to service the meter.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A meter casing having a base provided with meter and terminal chambers, covers for the said chambers, a sealing bar slidable alongside the terminal chamber, a clip adapted to protrude through one end of said terminal chamber and a terminal block adapted to be placed in said terminal chamber, said sealing bar being slidable between locking and unlocked positions, having a projection engaging said meter cover for preventing removal thereof when the sealing bar is in the locking position, having a flange and having a lateral arm with a slot therein through which said clip is adapted to protrude when said bar is in the locking position and with a lug for sealing the terminal chamber cover, said terminal chamber cover having a slot adapted to have said lug project therethrough when said bar is in the locking position and said latter cover is in place, said lug having a hole therein adapted to receive a sealing device, said base having a projecting portion intersecting the path of said slidable sealing bar, said portion having an L-slot therein, a portion of the bar being slidable through the side of the L and said flange of the bar being slidable through the base of the L, said flange being intermediate the ends of said bar, whereby the flange lies within said L-slot in said projecting portion of the base when the bar is in its unlocked position to prevent removal of the bar, and said flange clears the said slot but said slotted arm hooks over the said clip to prevent removal of the bar when in its locking position.

2. A casing having a base provided with a pair of chambers and an under-cut groove alongside one of said chambers, covers for the said chambers, a sealing bar slidable in said groove, a clip adapted to protrude through one end of the chamber adjacent the under-cut groove, said sealing bar being slidable between locking and unlocked positions, having a projection engaging one of said covers for preventing removal thereof when the sealing bar in in the locking position, having a flange slidably fitting the under-cut portion of said groove and having a lateral arm with a slot therein through which said clip is adapted to protrude when said bar is in the locking position, the second of said covers having a slot therein at one end thereof, said lateral arm having a lug adapted to project through the slot in said cover when said bar is in a locking position, and said latter cover is in place, said lug being adapted to receive a sealing device, the flange of said sealing bar being of less length than the bar and being spaced from the lateral arm of said bar, the length of said under-cut groove likewise being less than the length of said sealing bar and being positioned near the end of the second of said chambers whereby the flange of said bar lies in the under-cut portion of said groove when the bar is in its unlocked position to prevent removal of the bar and said flange clears the groove but said slotted lateral arm hooks over the said clip to prevent removal of the bar when in its locking position.

3. A hollow casing having a base provided with a chamber and having an under-cut groove, a cover for the chamber, a sealing bar, a clip adapted to protrude from within through one side of said casing base, said sealing bar being slidable between locking and unlocked position, having a projection engaging said cover for preventing removal thereof when the sealing bar is in a locking position, having a flange slidably fitting the under-cut portion of said groove and having a lateral arm with a slot therein through which said slip is adapted to protrude when said bar is in the locking position, said clip having wings at the inner portion thereof to prevent removal of said clip from the outside of said casing and having a hole in the portion thereof adapted to protrude for receiving a sealing device, the flange of said sealing bar extending along a portion of said bar, and being spaced from the lateral arm of said bar, the space between the flange and the lateral arm being greater than the length of the under-cut portion of said groove, whereby the flange lies within said under-cut portion of the groove and is held thereby when the bar is in the unlocked position thus preventing removal of the bar and said flange clears said under-cut portion of the groove but said slotted lateral arm hooks over said clip to prevent removal of the bar when in its locking position.

4. A sealing system for apparatus to be sealed comprising in combination with apparatus to be sealed having an under-cut groove therein, a sealing bar, a sealing clip removably secured to said apparatus, said sealing bar being slidable between locking and unlocked positions, having a flange slidably fitting the under-cut portion of said groove and having a lateral arm with a slot therein through which said clip is adapted to protrude when said bar is in the locking position, said clip having wings at the inner portion thereof preventing removal of said clip through said slot, the flange of said sealing bar extending along a portion of said bar, and being spaced from the lateral arm of said bar, the space between the flange and the lateral arm being greater than the length of the under-cut portion of said groove, whereby the flange lies within said undercut portion of the groove and is held thereby when the bar is in the unlocked position, and said flange clears said under-cut portion of the groove, but said slotted lateral arm hooks over said clip to prevent removal of the bar when in its locking position.

WENDELL H. CAMPBELL.

CERTIFICATE OF CORRECTION.

Patent No. 2,162,548. June 13, 1939.

WENDELL H. CAMPBELL.

It is hereby certified that error appears in the printed specification of the above numbered patent requiring correction as follows: Page 3, first column, line 59, claim 2, for the words "in in" read is in; and that the said Letters Patent should be read with this correction therein that the same may conform to the record of the case in the Patent Office.

Signed and sealed this 1st day of August, A. D. 1939.

(Seal)
Henry Van Arsdale,
Acting Commissioner of Patents.